United States Patent Office 2,821,767
Patented Feb. 4, 1958

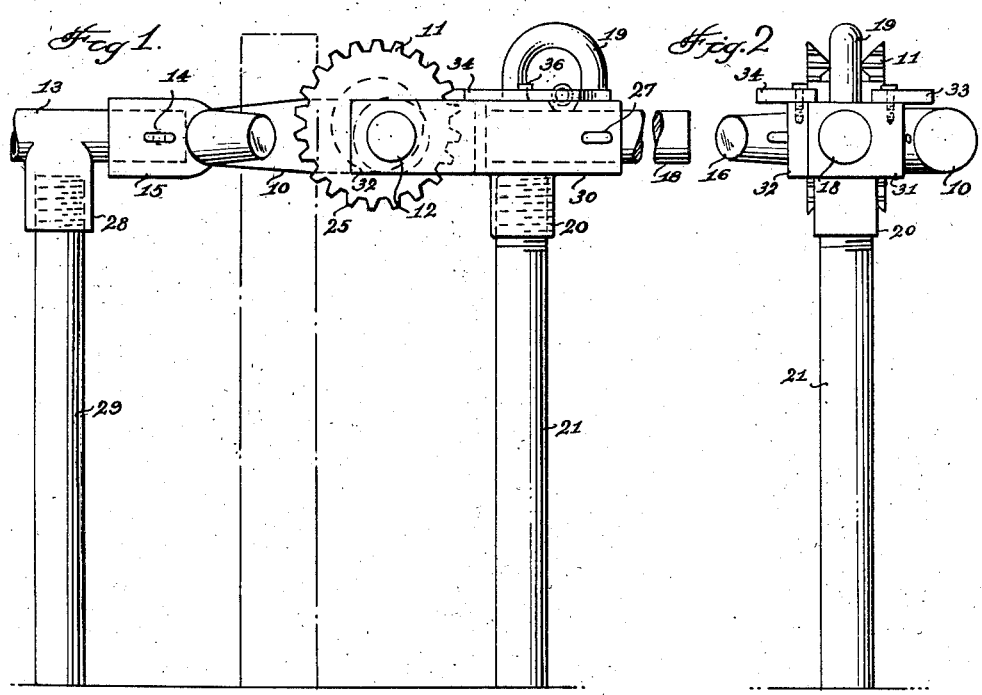
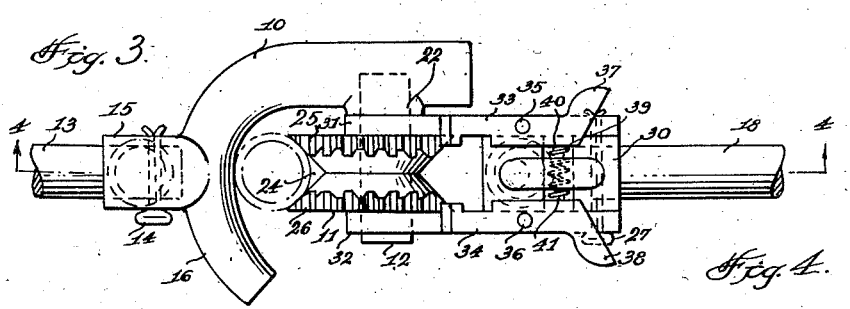
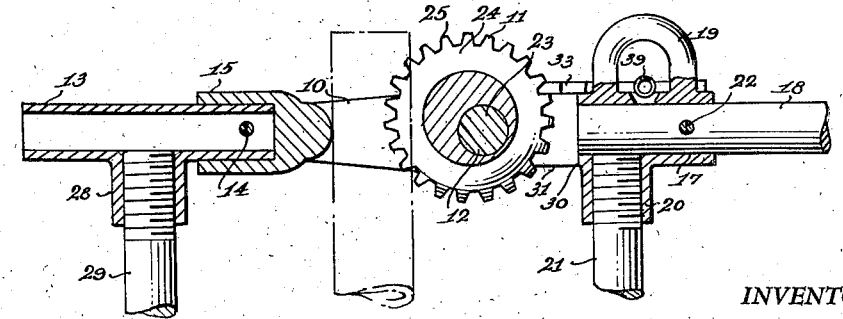
INVENTOR.
ASA A. PAYNE

2,821,767

PIPE LIFTING HOLDER

Asa A. Payne, Chippewa Falls, Wis.

Application November 3, 1954, Serial No. 466,597

2 Claims. (Cl. 24—249)

This invention relates to tools for holding and lifting pipe, such as from a well or the like, and in particular, a horizontally disposed frame having a hook with an eccentrically mounted toothed roller therein wherein pipe extended through the hook is adapted to be gripped by the roller to facilitate withdrawing and carrying the pipe.

The purpose of this invention is to provide a pipe gripping and holding tool by which pipe may be raised or carried by one or a plurality of persons or by a hoist or the like without danger of the pipe slipping through the device.

It is difficult to take hold of a vertically disposed piece of pipe, and although various types of pipe wrenches and other devices have been provided for gripping pipe, it is difficult to hold the pipe in such a manner that the pipe does not slip through the holding means. With this thought in mind, this invention contemplates a pipe holder having a gripping element rotatably mounted therein wherein the gripping element is eccentrically positioned so that once the pipe is gripped thereby it is substantially impossible for the pipe to slip downwardly through the device.

The object of this invention is, therefore, to provide means for forming a pipe holder and carrier in which the possibility of pipe slipping therethrough is obviated.

Another object of the invention is to provide a positive grip pipe holder in which pipe may readily be inserted and from which pipe may readily be removed.

A further object of the invention is to provide a positive grip pipe holder that is adapted to be supported by legs to provide a stand.

A still further object of the invention is to provide a pipe holder and carrier having positive gripping means therein in which the device is of a simple and economical construction.

With these and other objects and advantages in view, the invention embodies a pipe holder and lifting device including a hook-like body with a toothed roller eccentrically mounted therein, a leg attachment adapted to be secured in sockets at the ends of the body, said sockets also being adapted to receive handles, and latching elements for locking the pipe gripping elements in adjusted positions.

Other features and advantages of the invention will appear from the following description, taken in connection with the drawing, wherein:

Figure 1 is a front elevational view of the pipe gripping device showing a length of pipe extended between gripping elements thereof, the pipe being shown in broken lines and also showing the device mounted on legs.

Figure 2 is an end elevational view of the device also showing the device mounted on legs.

Figure 3 is a plan view of the device also showing a piece of pipe between the gripping elements and hook-like body, the pipe being shown in broken lines.

Figure 4 is a longitudinal section through the pipe gripping device taken on line 4—4 of Figure 3, also showing a piece of pipe extended between the gripping elements of the body with the pipe shown in broken lines.

Referring now to the drawing, wherein like reference characters denote corresponding parts, the improved pipe holder of this invention includes a hook-like body 10, a toothed roller 11 eccentrically positioned in the body and rotatably mounted on a stud 12, a T-shaped leg attachment 13 adapted to be secured by a pin 14 in a socket 15 in the arcuate hook-shaped end 16 of the body, a socket 17 adapted to receive a handle 18 positioned at the opposite end of the body, a loop 19 extended upwardly from the body and adapted to receive a hook or chain of a hoist or the like and an internally threaded socket 20 adapted to receive a leg, such as the leg 21.

As illustrated in Figure 3, the base portion of the body 10 is provided with a boss 22 through which the stud 12 extends and, as illustrated in Figure 4, the stud 12 is positioned in an eccentrically located opening 23 in the roller 11.

The peripheral surface of the roller 11 is provided with a groove 24 and the edges of the roller are provided with teeth 25 and 26.

With the roller mounted in this manner, a pipe inserted in the hook-like body from the lower side moves the roller upwardly and upon downward movement of the pipe the roller turns in a counter-clockwise direction providing a positive grip for retaining the pipe in position in the device. With the pipe held in this manner, it may readily be withdrawn from a well or elevated and carried, as may be desired.

The device may be elevated by a winch or hoist with the hook or chain thereof secured in the loop 19 or the device may be carried by hand with a handle, such as the handle 18 secured in the socket 17 with a pin 27, such as a cotter pin, and a similar handle may be secured in the socket 15 or in the extended end of the leg attachment 13.

The attachment 13 is provided with an internally threaded socket 28 in which a leg 29 may be threaded, and with the device supported on the legs 21 and 29, a pipe retaining stand is provided.

The socket 17 is provided in the end of a hub 30 from which arms 31 and 32 extend and, as shown in Figure 3, the hub is pivotally mounted on the stud 12 which extends through openings in the arms 31 and 32 and, as shown in Figure 4, the leg receiving socket 20 extends from the lower surface of the hub.

The upper surface of the hub 30 is flat and locking dogs 33 and 34, which are pivotally mounted with pins 35 and 36, respectively, on the hub are positioned to coact with the teeth 25 and 26 of the roller to lock the roller in adjusted positions. The locking dogs are provided with extended handles 37 and 38 by which the opposite ends of the dogs may be withdrawn from the teeth of the roller and the ends of the dogs on which the handles are positioned are urged outwardly by a spring 39 positioned between the dogs and secured in position by lugs 40 and 41 positioned on the inner surfaces of the dogs.

The pipe holder of this invention may be used with or without the legs, as may be desired, and the legs may be provided in different lengths whereby the pipe holder may be positioned at suitable elevations.

With the parts assembled in this manner, the holder is adapted to be positioned over the upper end of a section of pipe with the roller 11 turned in a clockwise direction and with the pipe in position, as shown in Figure 1, the roller is turned in a counter-clockwise direction whereby the gripping surfaces in the sides of the groove 24 positively grip the pipe so that the pipe may be moved upwardly and carried to suitable positions without danger of the pipe slipping in the holder.

It will be understood that modifications within the scope of the appended claims may be made in the design and arrangement of the parts without departing from the spirit of the invention.

What is claimed is:

1. In a pipe holder, the combination which comprises a one piece hook-like body having a longitudinally positioned socket extended from one end portion and having a transversely disposed stud extended from the opposite end, a roller having an annular groove in the peripheral surface rotatably mounted and eccentrically positioned on said stud and said stud being positioned whereby the roller urges a pipe extended within the bight of the hook-like body against the inner surface of the hook-like portion thereof, a hub having a handle receiving socket in the extended end pivotally mounted on said stud, said hub having a threaded socket extended from the lower surface adapted to receive a first leg, and a leg attachment having a threaded socket extended from the lower surface thereof adapted to receive a second leg, and adapted to be mounted in the socket extended from the hook-like body.

2. In a pipe holder, the combination which comprises a one piece hook-like body having a longitudinally positioned socket extended from one end and having a transversely disposed stud extended from the opposite end portion, a roller having an annular groove in the peripheral surface rotatably mounted and eccentrically positioned on said stud and said stud being positioned whereby the roller urges a pipe extended within the bight of the hook-like body against the inner surface of the hook-like portion thereof, a hub having a handle receiving socket in the extended end pivotally mounted on said stud, said hub having a threaded socket extended from the lower surface, a leg attachment having a threaded socket extended from the lower surface thereof and adapted to be mounted in the socket extended from the hook-like body, locking means mounted on the hub for securing the roller in adjusted positions, and legs having threaded ends adapted to be threaded into the sockets of the leg attachment and hub.

References Cited in the file of this patent

UNITED STATES PATENTS

| | | |
|---|---|---|
| 148,148 | Smith | Mar. 3, 1874 |
| 196,401 | Vermillion | Oct. 23, 1877 |
| 630,972 | Capewell | Aug. 15, 1899 |
| 702,334 | Schulte | June 10, 1902 |
| 976,600 | Rhodes | Nov. 22, 1910 |
| 996,259 | Kern | June 27, 1911 |
| 1,048,705 | Kleffman | Dec. 31, 1912 |
| 1,058,577 | Gardner | Apr. 8, 1913 |
| 1,061,691 | Righter | May 13, 1913 |
| 1,590,160 | Gluyas | June 22, 1926 |
| 1,736,290 | Schiff | Nov. 19, 1929 |
| 2,124,154 | Sovincz | July 19, 1938 |

FOREIGN PATENTS

| | | |
|---|---|---|
| 113,688 | Australia | Aug. 14, 1941 |